United States Patent
Wu et al.

(10) Patent No.: US 8,832,314 B2
(45) Date of Patent: Sep. 9, 2014

(54) INFORMATION SYNCHRONIZATION METHOD, APPARATUS AND SYSTEM

(75) Inventors: Huangwei Wu, Shenzhen (CN); Qinliang Zhang, Shenzhen (CN); Ping Fang, Shenzhen (CN); Yu Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/295,862

(22) Filed: Nov. 14, 2011

(65) Prior Publication Data

US 2012/0079053 A1 Mar. 29, 2012

Related U.S. Application Data

(63) Continuation of application No. PCT/CN2010/072724, filed on May 13, 2010.

(30) Foreign Application Priority Data

May 14, 2009 (CN) .......................... 2009 1 0138884

(51) Int. Cl.
*G06F 15/16* (2006.01)
*H04L 29/12* (2006.01)
*H04L 12/28* (2006.01)
*H04L 29/08* (2006.01)

(52) U.S. Cl.
CPC ........ *H04L 12/2834* (2013.01); *H04L 61/2535* (2013.01); *H04L 67/1095* (2013.01); *H04L 29/12367* (2013.01); *H04L 29/12424* (2013.01); *H04L 61/2514* (2013.01)
USPC ........... 709/245; 340/1.1; 340/16.1; 370/474; 370/475; 710/3; 709/207; 709/246; 709/250; 709/227

(58) Field of Classification Search
USPC ........................................................ 709/245
See application file for complete search history.

(56) References Cited

U.S. PATENT DOCUMENTS 7,107,614 B1 9/2006 Boden et al.
7,921,194 B2 4/2011 Song et al.
(Continued)

FOREIGN PATENT DOCUMENTS

CN 1744565 A 3/2006
CN 101228742 A 7/2008
(Continued)

OTHER PUBLICATIONS

Chinese Office Action, Application No. 200910138884.6, dated Mar. 23, 2011, 9 pages.

(Continued)

*Primary Examiner* — Jude Jean Gilles
*Assistant Examiner* — Jaren M Means
(74) *Attorney, Agent, or Firm* — Slater & Matsil, L.L.P.

(57) ABSTRACT

An information synchronization method includes acquiring declaration information of a first local area network device that is in a first local area network. The declaration information includes a private address of the first local area network device in the first local area network. The private address of the first local area network device is mapped into a corresponding external address according to a preset mapping relation between private addresses and external addresses. A notification message carrying the external address of the first local area network device is sent to a second local area network, so as to enable the second local area network to store the external address of the first local area network device and notify a state of the first local area network device to a second local area network device in the second local area network.

15 Claims, 7 Drawing Sheets

(56) References Cited

U.S. PATENT DOCUMENTS

| | | | |
|---|---|---|---|
| 2003/0145104 A1 | 7/2003 | Boden et al. | |
| 2005/0066035 A1* | 3/2005 | Williams et al. | 709/226 |
| 2006/0291502 A1 | 12/2006 | Kalofonos | |
| 2007/0233845 A1* | 10/2007 | Song et al. | 709/223 |
| 2008/0298367 A1 | 12/2008 | Furukawa | |
| 2009/0119766 A1 | 5/2009 | Huetter et al. | |
| 2009/0245266 A1* | 10/2009 | Cho et al. | 370/401 |

FOREIGN PATENT DOCUMENTS

| | | |
|---|---|---|
| CN | 101562639 A | 10/2009 |
| EP | 2 273 722 A1 | 1/2011 |
| JP | 2000-156710 A | 6/2000 |
| JP | 2002-217941 A | 8/2002 |
| JP | 2003-152767 A | 5/2003 |
| KR | 10-2008-0026628 A | 3/2008 |
| KR | 10-2008-0105961 A | 12/2008 |
| WO | WO 2007/142485 A1 | 12/2007 |

OTHER PUBLICATIONS

International Search Report, PCT/CN2010/072724, dated Aug. 19, 2010, 6 pages.

Written Opinion of the International Searching Authority, PCT/CN2010/072724, dated Aug. 19, 2010, 5 pages.

Russell, B., et al., "Remote Access Architecture: 1, for UPnP™ Version 1.0," dated Feb. 2, 2009, 31 pages.

Korean Intellectual Property Office Notice to Submit a Response, received in Patent Application No. 10-2011-7028738, Applicant: Huawei Technologies Co. Ltd., mailed Dec. 18, 2012, 9 pages.

European Search Report, Application No. 10774558.0-1525, PCT/CN2010/072724, Huawei Device Co. Ltd., Jun. 1, 2012, 5 pages.

Notice of Reasons for Rejection received in Application No. 2012-510103 mailed Feb. 5, 2013, 4 pages.

Korean Final Office Action for Application No. 10-2011-7028738, mailed Jun. 25, 2013 with English translation, 6 pages.

* cited by examiner

INFORMATION SYNCHRONIZATION METHOD, APPARATUS AND SYSTEM

This application is a continuation of International Application No. PCT/CN2010/072724, filed on May 13, 2010, which claims priority to Chinese Patent Application No. 200910138884.6, filed on May 14, 2009, both of which are hereby incorporated by reference in their entireties.

TECHNICAL FIELD

The present invention relates to the communication field, and in particularly, to an information synchronization method, apparatus and system.

BACKGROUND

As consumer electronic products tend to be generally digitized, more and more digital entertainment devices and household appliances appear in homes. It is a concept of a digital home network being conceived and realized in the industry to connect these home network devices into a home network in a wired or wireless manner, so as to implement functions such as content sharing or mutual control.

A Universal Plug and Play (UPnP) protocol is capable of implementing control over devices in a home network and interconnection among the devices in the home network. The UPnP defines a remote access mechanism, so as to implement UPnP communication between two different networks. For example, a remote network accesses device in a home network, and in the remote access mechanism of the UPnP, the remote network and the home network perform control and communication through the UPnP protocol.

In the implementation of the present invention, the inventor finds that the following problems exist when the remote network accesses the home network using the UPnP protocol.

When private addresses of devices in two local area networks performing communication using the UPnP protocol are in conflict, for example, when both the remote network and the home network are local area networks, and a certain device in the home network and a device in the remote network use the same private IP address, address conflict occurs. At this time, the two local area networks cannot conduct communication.

SUMMARY OF THE INVENTION

Embodiments of the present invention provide an information synchronization method, apparatus and system, which solves the problem of address conflict occurring when two local area networks use an UPnP protocol to communicate with each other.

An embodiment of the present invention provides an information synchronization method, including: acquiring declaration information of a first local area network device that is in a first local area network, where the declaration information includes a private address of the first local area network device in the first local area network; mapping the private address of the first local area network device into a corresponding external address according to a preset mapping relation between private addresses and external addresses; and sending a notification message carrying the external address of the first local area network device to a second local area network, so as to enable the second local area network to store the external address of the first local area network device and notify a state of the first local area network device to a second local area network device in the second local area network.

An embodiment of the present invention further provides an information synchronization apparatus. A private address acquiring module is configured to acquire declaration information of a first local area network device that is in a first local area network, where the declaration information includes a private address of the first local area network device in the first local area network. An address mapping module is configured to map the private address of the first local area network device acquired by the private address acquiring module into a corresponding external address according to a preset mapping relation between private addresses and external addresses. A synchronization information sending module is configured to send a second local area network a notification message carrying the external address obtained through mapping by the address mapping module, so as to enable the second local area network to store the external address of the first local area network device and notify a state of the first local area network device to a second local area network device in the second local area network.

An embodiment of the present invention further provides an information synchronization system, including a first information synchronization apparatus and a second information synchronization apparatus. The first information synchronization apparatus and the second information synchronization apparatus are located in a first local area network and a second local area network respectively.

The first information synchronization apparatus is configured to acquire declaration information of a first local area network device that is in the first local area network, where the declaration information includes a private address of the first local area network device in the first local area network, map the private address of the first local area network device into a corresponding external address according to a preset mapping relation between private addresses and external addresses, and send a notification message carrying the external address of the first local area network device to the second information synchronization apparatus.

The second information synchronization apparatus is configured to receive the notification message sent by the first information synchronization apparatus, store the external address of the first local area network device carried in the notification message, and notify a state of the first local area network device to a second local area network device in the second local area network.

According to the information synchronization method, apparatus and system provided in the embodiments of the present invention, a private address of a first local area network device can be translated into an external address, and a second local area network is notified, so that the second local area network can store the external address of the first local area network device and notify a second local area network device of a state of the first local area network device, thereby achieving the objective of synchronizing information between the first local area network device and the second local area network device. Since the technical solutions according to the embodiments of the present invention can translate the private address of the first local area network device into an external address, the problem of address conflict that may exist between the first local area network and the second local area network is solved, thereby achieving the objective of avoiding address conflict.

BRIEF DESCRIPTION OF THE DRAWINGS

The accompanying drawings here are used to provide further comprehension on the present invention, form a part of the present application, but are not intended to limit the present invention. In these drawings.

DETAILED DESCRIPTION OF ILLUSTRATIVE EMBODIMENTS

In order to make the objectives, technical solutions, and advantages of the present invention more comprehensible, the present invention is described in further detail in the following with reference to embodiments and the accompanying drawings. Here, the exemplary embodiments of the present invention and illustrations thereof are used to interpret the present invention, but are not intended to limit the present invention.

Figure 1:
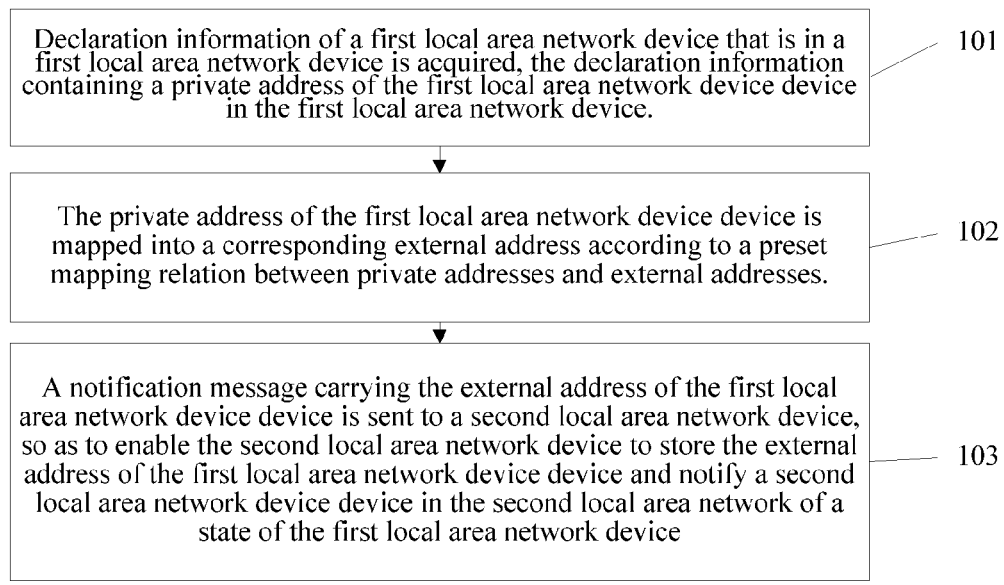
FIG. 1 is a flow chart of an information synchronization method according to Embodiment 1 of the present invention.

To solve the problem of address conflict occurring when two local area networks perform communication using an UPnP protocol, Embodiment 1 of the present invention provides an information synchronization method. As shown in FIG. 1, the method includes the following.

Step 101: Declaration information of a first local area network device that is in a first local area network is acquired, where the declaration information includes a private address of the first local area network device in the first local area network.

In this embodiment, when a state of a first local area network device changes, for example, the first local area network device is online or offline, the first local area network device may send declaration information to a first local area network, where the declaration information is used to declare the change in the state of the first local area network device to the first local area network.

Step 102: The private address of the first local area network device is mapped into a corresponding external address according to a preset mapping relation between private addresses and external addresses.

In this embodiment, the external address is an address unused in the first local area network and the second local area network, for example, when the private addresses used by the first local area network are 192.168.1.0 to 192.168.1.10 and the private addresses used by the second local area network are 192.168.1.5 to 192.168.1.25, the external address of the first local area network may be set as 192.168.2.0 to 192.168.2.10, or 192.168.1.30 to 192.168.1.40, which will not be described in detail here one by one. The mapping relation between private addresses and external addresses may be one-to-one mapping, or one-to-many mapping.

Step 103: A notification message carrying the external address of the first local area network device is sent to a second local area network, so as to enable the second local area network to store the external address of the first local area network device and notify a state of the first local area network device to a second local area network device in the second local area network.

According to the information synchronization method provided in the embodiment of the present invention, a private address of a first local area network device can be translated into an external address, and a second local area network is notified, so that the second local area network can store the external address of the first local area network device and notify a second local area network device of a state of the first local area network device, thereby achieving the objective of synchronizing information between the first local area network device and the second local area network device. Since the technical solution according to the embodiment of the present invention can translate the private address of the first local area network device into an external address, the problem of address conflict that may exist between the first local area network and the second local area network is solved, thereby achieving the objective of avoiding address conflict.

Embodiment 2 of the present invention is introduced in the following with reference to the accompanying drawings.

Figure 2:
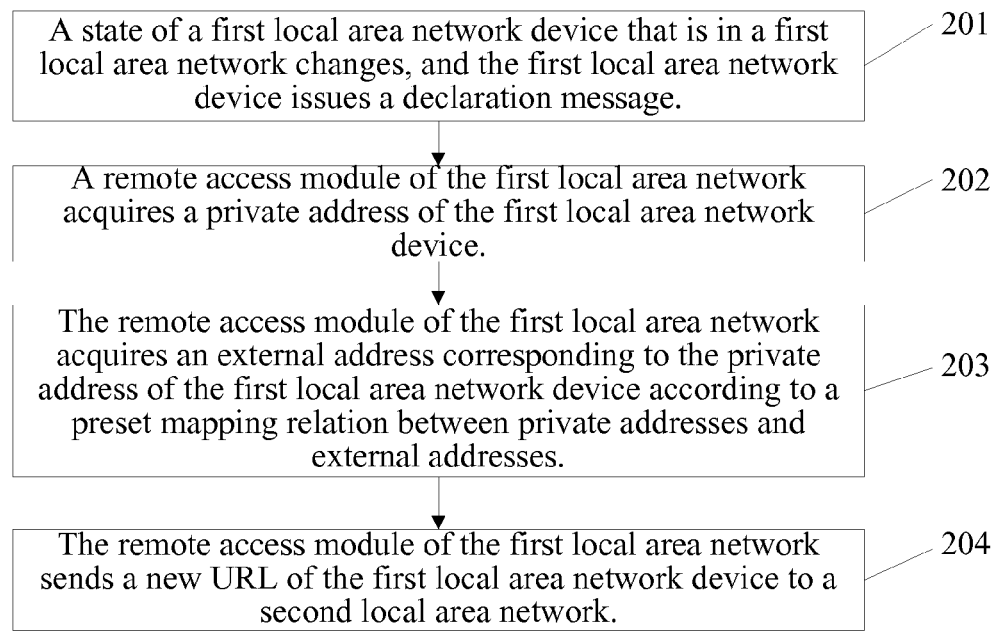
FIG. 2 is a flow chart of an information synchronization method according to Embodiment 2 of the present invention.

An embodiment of the present invention provides an information synchronization method, which solves the problem of address conflict occurring during remote access between local area networks. As shown in FIG. 2, the method specifically includes the following.

Step 201: A state of a first local area network device that is in a first local area network changes, and the first local area network device issues a declaration message.

After two local area networks which are communication peers to each other establish a connection and communicate through an UPnP protocol, when a state of a first local area network device that is in a first local area network changes, for example, the device is online or offline, the first local area network device may send a declaration message in the first local area network, where the declaration message may be ssdp:alive (being used to declare that the device is online). The ssdp:alive message carries information on the first local area network device including a Universal Resource Locator (URL), and the URL includes a private address of the first local area network device.

If the device is online, it is required to add an address of the device to a local device list of the first local area network; and if the device is offline, it is required to delete the address of the device from the local device list of the first local area network.

Step 202: A remote access module of the first local area network acquires a private address of the first local area network device.

After knowing that the state of the first local area network device changes, the remote access module of the first local area network acquires the private address of the first local area network device, which specifically is as follows: acquiring the URL from the information sent by the first local area network device, and extracting the private address of the first local area network device in the first local area network from the acquired URL.

Step 203: The remote access module of the first local area network acquires an external address corresponding to the private address of the first local area network device according to a preset mapping relation between private addresses and external addresses.

Step 204: The remote access module of the first local area network sends a new URL of the first local area network device to a second local area network.

In this step, the remote access module of the first local area network replaces the private address in the URL of the first local area network device with the external address, and notifies the second local area network of information on the first local area network device, where the information on the first local area network device includes an identifier of the first local area network device and the external address of the first local area network device.

For the second local area network, the address of the first local area network device is the external address obtained through mapping in step 203, the second local area network knows that a packet is sent from the first local area network device when receiving the packet taking the external address of the first local area network as a source address, and the second local area network may also take the external address of the first local area network device as a destination address when sending a packet to the first local area network device.

The operation process of synchronizing information on the second local area network device in the second local area network to the first local area network is similar to the above process, which is not be described in detail here again.

According to the information synchronization method provided in the embodiment of the present invention, a private address of a first local area network device can be translated into an external address, and a second local area network is notified, so that the second local area network can store the external address of the first local area network device and notify a second local area network device of a state of the first local area network device, thereby achieving the objective of synchronizing information between the first local area network device and the second local area network device. Since the technical solution according to the embodiment of the present invention can translate the private address of the first local area network device into an external address, the problem of address conflict that may exist between the first local area network and the second local area network is solved, thereby achieving the objective of avoiding address conflict.

Figure 3:
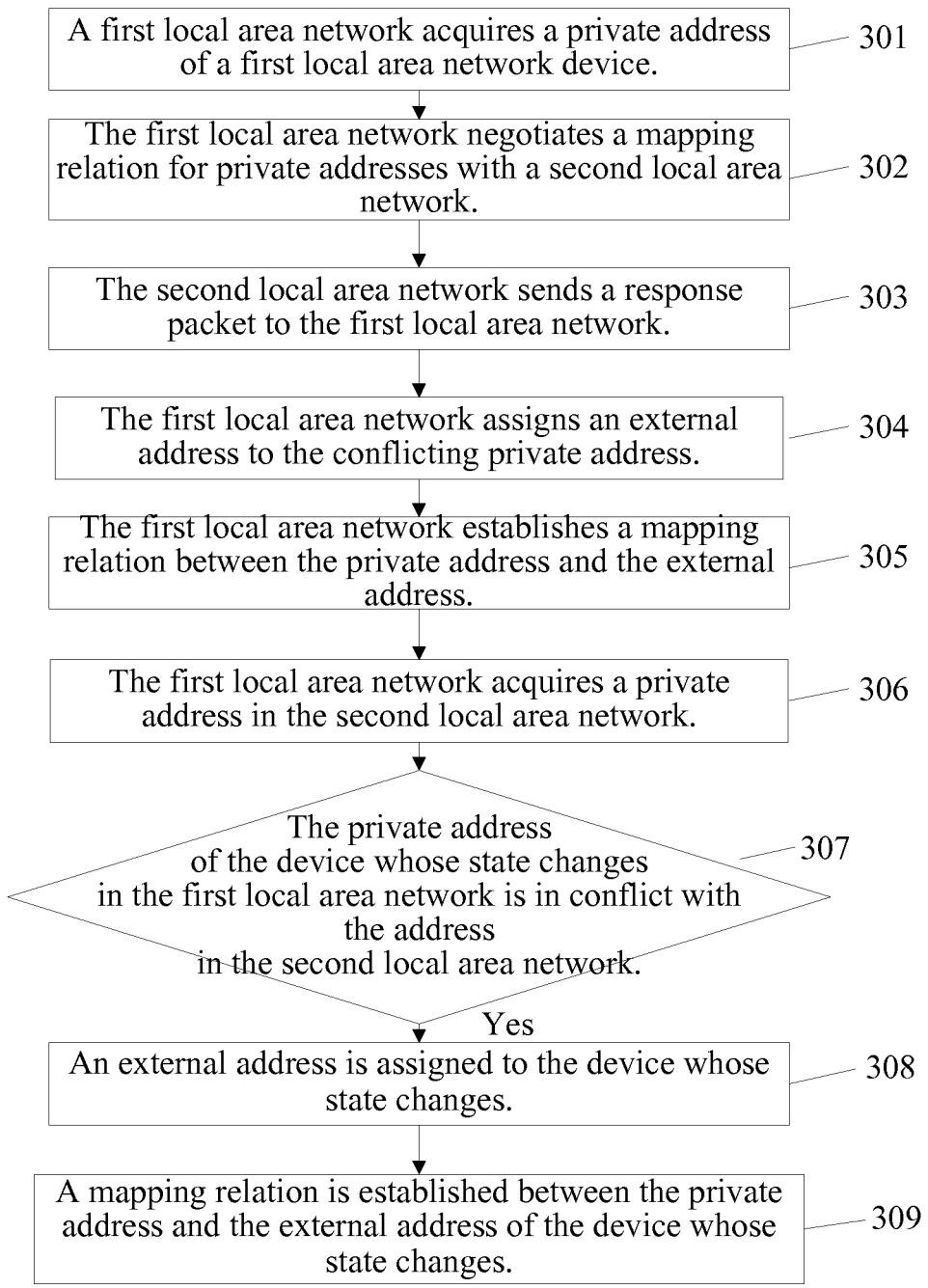
FIG. 3 is a flow chart of an information synchronization method according to Embodiment 3 of the present invention.

For two local area networks between which a remote connection has been established just now, if the two local area networks conduct communication through an UPnP protocol but address conflict exist between the two local area networks, which may cause a problem that the two local area networks cannot operate normally. To solve this problem, Embodiment 3 of the present invention provides an information synchronization method. If the method is used to synchronize address information when two local area networks establish a remote connection, normal communication in the case of address conflict can be implemented. As shown in FIG. 3, the information synchronization method includes the following steps.

Step 301: A first local area network acquires a private address of a first local area network device.

After a first local area network and a second local area network establish a remote connection, a remote access module (for example, RAS, RAC) of the first local area network acquires a private address of a first local area network device.

In this embodiment of the present invention, the private address of the first local area network device may be configured by the remote access module of the first local area network when remote access is established.

The configuration process may be implemented by adding an action to the remote access module of the first local area network, and the action is used to configure the private address of the first local area network device, for example, an action SetLocalNetAddress( ) is added, and parameters of the action are as shown in Table 1.

The subnet address is a network segment of the first local area network, and the remote access module of the first local area network determines the network segment used by the first local area network with the configuration of the action, that is to say, the remote access module of the first local area network determines a range of private addresses used by the first local area network. According to actual requirements, one local area network may include a plurality of subnet addresses, and at this time, it only needs to add several groups of NetAddress and Mask parameters to the action SetLocalNetAddress( ).

TABLE 1

| Parameter Name | Direction | Remarks |
| --- | --- | --- |
| NetAddress | Input parameter | Subnet address |
| Mask | Input parameter | Subnet mask |

In the first local area network, a private address may be assigned to the first local area network device through a DHCP SERVER on a gateway; therefore, the remote access module of the first local area network may also directly acquire information on the private address of the first local area network device from the gateway of the first local area network. As required, the remote access module of the first local area network may selectively acquire a subnet address of the first local area network, or a private address of each first local area network device, which is not limited in this embodiment of the present invention.

Step 302: The first local area network negotiates a mapping relation for private addresses with a second local area network.

After the first local area network and the second local area network establish a remote access connection, the first local area network may send a private address of the first local area network to the second local area network, for example, an action NegotiatieAddress( ) is added to a remote access module of the second local area network, and the first local area network negotiates a mapping relation for private addresses with the second local area network by calling the action, and parameters of the action are shown in Table 2:

TABLE 2

| Parameter Name | Direction | Remarks |
| --- | --- | --- |
| NetAddress | Input parameter | Subnet address |
| Mask | Input parameter | Subnet mask |

Table 2 carries a subnet address currently used by the first local area network.

Table 2 may also carry private addresses of first local area network devices in the first local area network, and at this time, it only needs to modify the NetAddress parameter in the action NegotiatieAddress( ) into carrying private addresses.

Step 303: The second local area network sends a response packet to the first local area network.

After receiving the information on the private address of the first local area network, the remote access module of the second local area network makes a judgment in combination with a private address of the second local area network.

The second local area network judges whether address information carried in the action NegotiatieAddress( ) is in conflict with an address of a second local area network device. If the address information carried in the action NegotiatieAddress( ) is in conflict with the address of the second local area network device, a response is returned to the first local area network to indicate that address conflict occurs, and step 304 is performed; the address information carried in the action NegotiatieAddress( ) is not in conflict with the address of the second local area network device, a response is returned to the first local area network to indicate that no address conflict occurs.

Step 304: The first local area network assigns an external address to the conflicting private address.

If a subnet address is used, a uniform external address is assigned to the conflicting subnet address, and the external address is also a network segment and is not used by the first local area network, for example, if the conflicting subnet address is 192.168.3.0 and the subnet mask is 255.255.255.0, the external address assigned to the subnet address may be 192.168.4.0 and the subnet mask is 255.255.255.0.

If a device address is used, an external address is assigned to the conflicting device address, and the external address is not used by the first local area network, for example, if the conflicting private address of the first local area network device is 192.168.1.7 and the subnet mask is 255.255.255.0, 192.168.10.7 may be taken as the external address of the device.

Then, steps 302 and 304 are repeated, and a newly assigned external address is used to negotiate with the second local area network whether address conflict exists until no address conflict exists.

Step 305: The first local area network establishes a mapping relation between the private address and the external address.

If, in step 303, the response of the second local area network indicates that no address conflict exists and the first local area network has assigned an external address to the private address through step 304, a mapping relation is established between the private address and the external address.

If a subnet address is used, a mapping relation is established between the subnet address and an external address of the subnet address, and exists in the remote access module of the first local area network as an entry in the IP address mapping table, as shown in Table 3:

TABLE 3

| Private address | Subnet mask | External address |
|---|---|---|
| 192.168.3.0 | 255.255.255.0 | 192.168.4.0 |

If a device address is used, a mapping relation is established between the device address and the external address, and the relation is stored in the remote access module as an entry in the IP address mapping table, as shown in Table 4:

TABLE 4

| Private address | Subnet mask | External address |
|---|---|---|
| 192.168.1.7 | 255.255.255.0 | 192.168.10.7 |

It is required to repeat steps 302 to 305, until all conflicting private addresses are assigned with corresponding external addresses.

It should be noted that, the information synchronization process takes the first local area network as an example for illustration, but in actual operations, the second local area network also needs to translate a private address, and the process thereof is basically consistent with the above process, which is not described here in detail again.

When the state of the first local area network device in the first local area network changes, it is required to judge whether the private address of the first local area network device whose state changes is in conflict with the private address in the second local area network, and to update an address mapping rule for the first local area network device whose state changes when conflict occurs. The specific steps are as follows.

Step 306: The first local area network acquires a private address in the second local area network.

In this step, the first local area network firstly needs to acquire address space of the second local area network, that is, private addresses that have been used and are to be used in the second local area network, and in this way, the remote access module of the first local area network can judge whether the private address of the first local area network device is in conflict with the address in the second local area network.

Step 307: It is judged whether the private address of the first local area network device whose state changes in the first local area network is in conflict with the address in the second local area network.

Step 308: If the private address of the first local area network device whose state changes in the first local area network is in conflict with the private address in the second local area network, an external address is assigned to the device whose state changes.

In this step, the first local area network needs to assign an external address to the first local area network device whose state changes, and then communicate with the second local area network through the external address.

The external address is a private address unused by the first local area network and the second local area network, and under such a principle, many methods can be adopted for assigning an external address, and an external address may be obtained by changing the network segment of the private address, for example, when the private address of the first local area network device is 192.168.1.3, and 192.168.10.0 is a subnet segment unused by both the first local area network and the second local area network, 192.168.1.3 may be translated into 192.168.10.3. Persons skilled in the art obviously know that many other means may also be adopted for implementing address translation, which are not be described in detail here one by one.

Step 309: A mapping relation is established between the private address and the external address of the first local area network device whose state changes.

Step 309: The private address of the first local area network device whose state changes is associated with the external address assigned in step 308 to establish a mapping relation, and the mapping relation is stored in the remote access module of the first local area network.

The external address corresponding to the private address of the first local area network device whose state changes can be obtained according to the mapping relation established in steps 306 to 309.

According to the information synchronization method provided in this embodiment of the present invention, after two local area networks are connected in the form of remote access, a conflicting private address is translated into an external address by negotiating a mapping relation for private addresses, and a peer local area network is notified of the external address, which achieves the objective of conducting communication by using a translated external address and solves the problem of address conflict.

Figure 4:
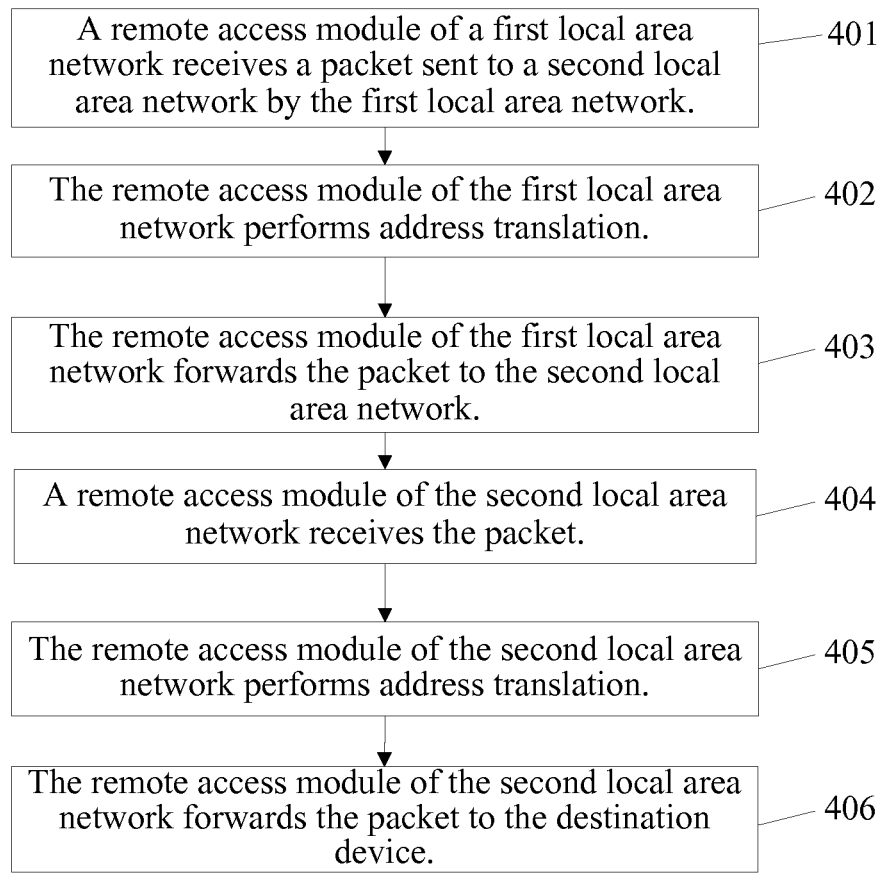
FIG. 4 is a flow chart of an information synchronization method according to Embodiment 4 of the present invention.

After an external address is assigned to the private address with address conflict, the device may communicate with the peer local area network through the external address. Embodiment 4 of the present invention provides an information synchronization method, which implements communication between devices in two local area networks with address conflict during the remote access. As shown in FIG. 4, the method includes the following steps.

Step 401: A remote access module of a first local area network receives a packet sent to a second local area network by the first local area network.

For the first local area network, when a first local area network device therein sends a packet to a second local area network, the packet may firstly reach a remote access module of the first local area network, and the remote access module of the first local area network performs address translation.

A source device (a first local area network device) that sends the packet is located in the first local area network, and a destination device (a second local area network device) that receives the packet is located in the second local area network; and a source address of the packet is a private address of the source device in the first local area network, and a destination address of the packet is an address of the destination device stored in the first local area network. If the destination device has a corresponding external address, the destination address is the external address of the destination device; if the destination device has no corresponding external address, the destination address is the private address of the destination device.

Step 402: The remote access module of the first local area network performs address translation.

Figure 5:
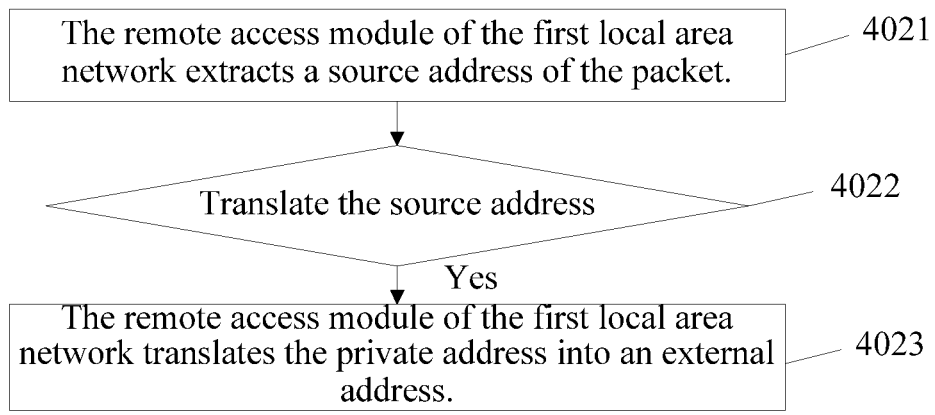
FIG. 5 is a specific flow chart of step 402 in FIG. 4.

The specific steps, as shown in FIG. 5, include the following.

Step 4021: The remote access module of the first local area network extracts a source address of the packet.

After receiving the packet, the remote access module of the first local area network may extract a source address of the packet, and at this time, the source address of the packet is the private address of the source device sending the packet.

Step 4022: The remote access module of the first local area network judges whether it is necessary to translate the source address.

In this step, it is judged, according to the private address acquired in step 4021, whether an entry in the IP address mapping table corresponding to the private address exists, and if the entry in the IP address mapping table does not exist, the packet is directly forwarded to the second local area network, and if the entry in the IP address mapping table exists, it is required to translate the source address.

Step 4023: The remote access module of the first local area network translates the private address into an external address.

If a judgment result of step 4022 is that it is required to perform translation, in this step, an entry in the IP address mapping table stored on the remote access module of the first local area network is looked up according to the private address acquired in step 4021, so as to acquire an external address corresponding to the private address.

Step 403: The remote access module of the first local area network forwards the packet to the second local area network.

The remote access module of the first local area network takes the external address corresponding to the source address of the packet acquired in step 402 as a new source address of the packet, and forwards the packet to the second local area network.

Step 404: A remote access module of the second local area network receives the packet.

In this step, a remote access module of the second local area network receives the packet sent by the first local area network.

Step 405: The remote access module of the second local area network performs address translation.

Figure 6:
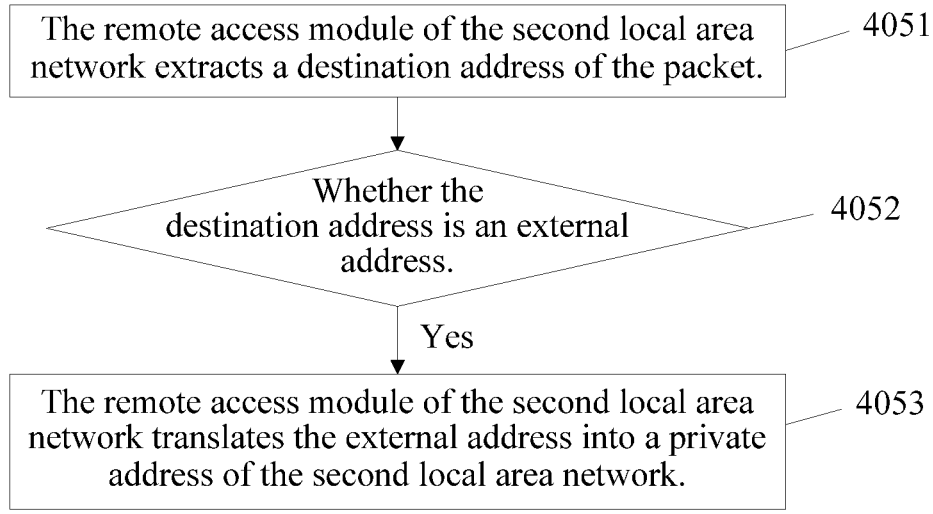
FIG. 6 is a specific flow chart of step 405 in FIG. 4.

The specific steps, as shown in FIG. 6, include the following.

Step 4051: The remote access module of the second local area network extracts a destination address of the packet.

Step 4052: The remote access module of the second local area network judges whether the destination address is an external address.

The remote access module of the second local area network looks up an entry in the IP address mapping table stored on the remote access module of the second local area network according to the destination address extracted in step 4051, and if the corresponding entry in the IP address mapping table exists, the destination address is an external address of the destination device.

Step 4053: The remote access module of the second local area network translates the external address into a private address of the second local area network.

In this step, a private address corresponding to the external address of the destination device is obtained according to the entry in the IP address mapping table.

Step 406: The remote access module of the second local area network forwards the packet to the destination device.

In this step, the remote access module of the second local area network takes the private address of the destination device as a new destination address of the packet, and forwards the packet to the second local area network.

Steps 401 to 406 are the process of sending a packet to a second local area network by a first local area network, and the process of sending a packet to the first local area network through the second local area network is basically consistent with the above process, which is not described in detail here again.

According to the information synchronization method provided in this embodiment of the present invention, when two local area networks are connected in the form of remote access, communication is performed through external addresses of devices; when a packet is sent, a source address of the packet is translated from a private address into an external address, and the external address is taken as a new source address to send the packet; when the packet is received, a destination address of the packet is translated from an external address into a private address, and the packet is sent to the receiver according to the private address without changing the original private address of the device, which completes communication only through address translation and solves the problem that communication cannot be conducted in the case of address conflict.

Figure 7:
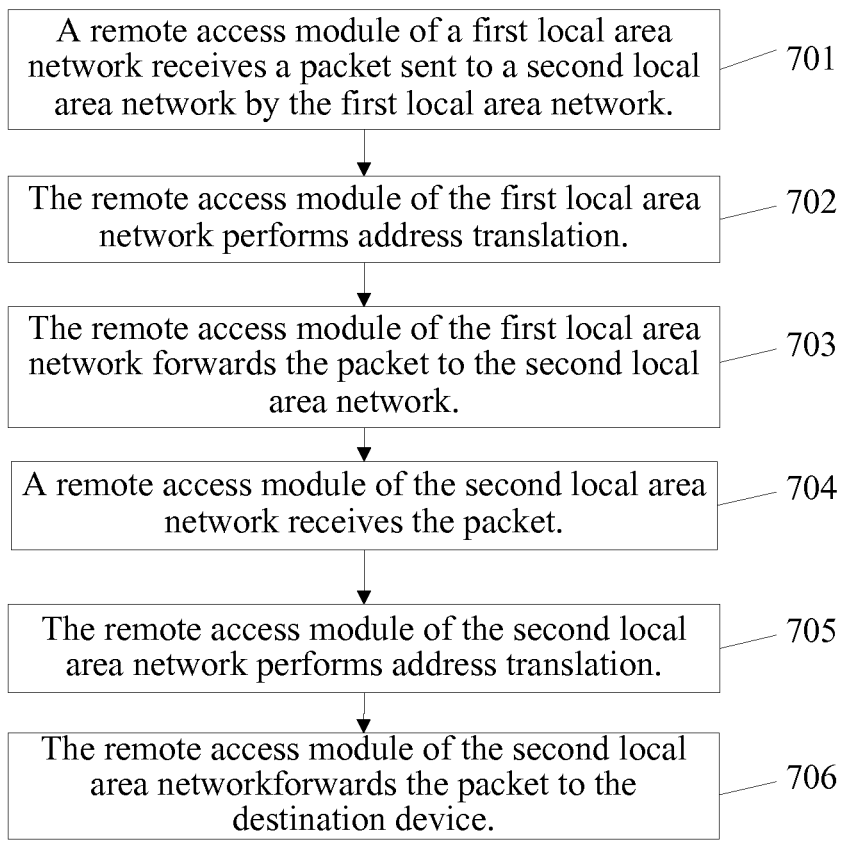
FIG. 7 is a flow chart of an information synchronization method according to Embodiment 5 of the present invention.

Between two local area networks connected in the form of remote access based on an UPnP protocol, if an application layer of the packet carries address information during the communication, it is required to translate the address information. Embodiment 5 of the present invention provides an information synchronization method, which can implement translation of address information. As shown in FIG. 7, the method includes the following.

Step 701: A remote access module of a first local area network receives a packet sent to a second local area network by the first local area network.

In this step, for the first local area network, when a first local area network device therein sends a packet to a second local area network, the packet may firstly reach a remote access module of the first local area network, and the remote access module of the first local area network performs address translation.

A source device (a first local area network device) that sends the packet is located in the first local area network, and a destination device (a second local area network device) that receives the packet is located in the second local area network; and a source address of the packet is a private address of the source device in the first local area network, and a destination address of the packet is an address of the destination device stored in the first local area network. If the destination device in the second local area network has a corresponding external address, the destination address is the external address of the destination device; if the destination device in the second local area network has no corresponding external address, the destination address is the private address of the destination device.

In this embodiment, an application layer of the packet carries address information, and the address information includes a private address in the first local area network, for example, a URL is carried in content of the packet, and the URL carries a private address of the first local area network device.

Step 702: The remote access module of the first local area network performs address translation.

In this step, it is required to translate the source address of the packet, that is, the private address of the source device, and it is also required to translate the private address in the first local area network included in the address information. For specific steps of translating the source address of the packet, reference can be made to step 402 in Embodiment 4 of the present invention. The following introduces the steps of translating the private address in the first local area network included in the address information in details.

Figure 8:
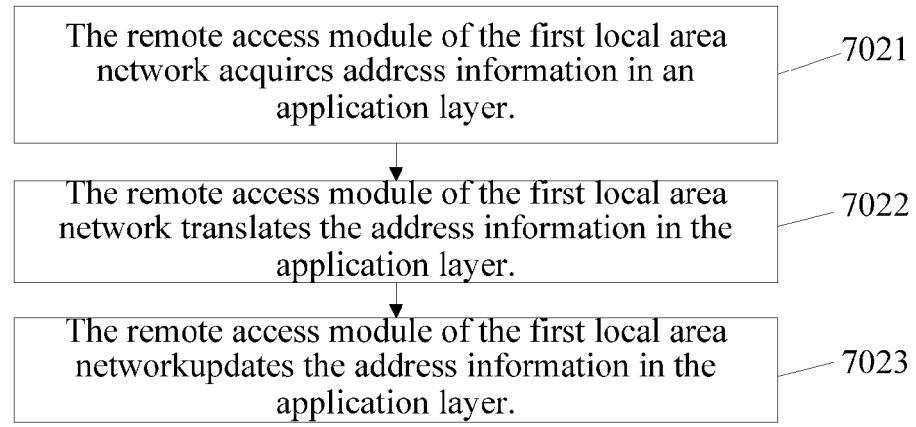
FIG. 8 is a specific flow chart of step 702 in FIG. 7.

As shown in FIG. 8, in step 7021, the remote access module of the first local area network acquires address information in an application layer.

In this step, it is required to analyze content of the packet and extract address information from the content of the packet; if a URL is carried in the content of the packet, and the URL carries a private address of the first local area network device, it is required to acquire the private address carried in the URL in this step.

Step 7022: The remote access module of the first local area network translates the address information in the application layer.

The remote access module of the first local area network looks up an entry in the IP address mapping table according to the private address acquired in step 7021, and maps the private address into a corresponding external address according to the entry in the IP address mapping table.

Step 7023: The remote access module of the first local area network updates the address information in the application layer.

The remote access module of the first local area network replaces the private address with the external address obtained through translation, and updates the address information in the application layer.

It should be noted that, the address information in the application layer may include a plurality of private addresses in the first local area network, and each private address may exist at a plurality of positions in the application layer, and it is required to replace all the private addresses with corresponding external addresses.

Step 703: The remote access module of the first local area network forwards the packet to the second local area network.

In this step, the external address corresponding to the source address of the source device is taken as a new source address of the packet, and the packet is forwarded to the second local area network.

Step 704: A remote access module of the second local area network receives the packet.

In this step, a remote access module of the second local area network receives the packet sent by the first local area network.

Step 705: The remote access module of the second local area network performs address translation.

In this step, it is required to translate the destination address of the packet and the address information carried in the application layer of the packet. For the steps of translating the destination address of the packet, reference can be made to step 405 in Embodiment 4 of the present invention. The following introduces the process of translating the address information carried in the application layer of the packet with reference to the accompanying drawings.

Figure 9:
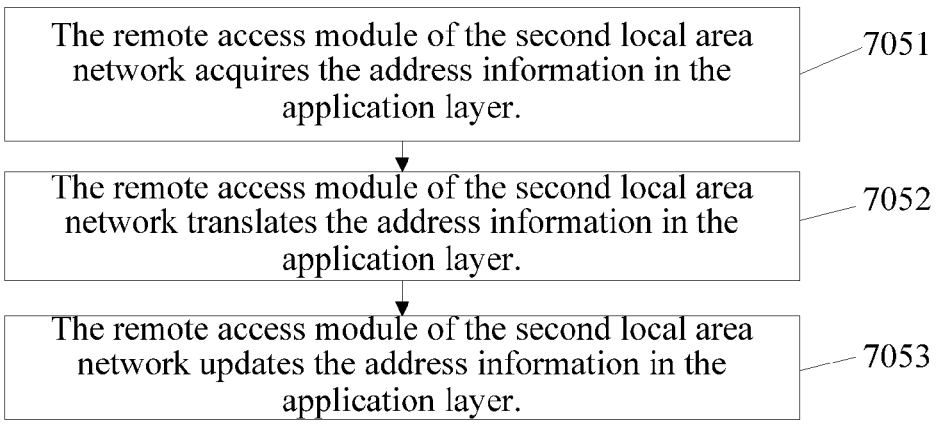
FIG. 9 is a specific flow chart of step 705 in FIG. 7.

The process, as shown in FIG. 9, includes the following.

Step 7051: The remote access module of the second local area network acquires the address information in the application layer.

In this step, it is required to analyze content of the packet and extract address information from the content of the packet; if a URL is carried in content of the packet, and the URL carries an external address of a device in the second local area network, it is required to acquire the external address of the device in the second local area network carried in the URL in this step.

Step 7052: The remote access module of the second local area network translates the address information in the application layer.

In this step, an entry in the IP address mapping table is looked up according to the external address acquired in step 7051, and the external address is mapped into a corresponding private address according to the entry in the IP address mapping table.

Step 7053: The remote access module of the second local area network updates the address information in the application layer.

In this step, the external address is replaced with the private address obtained through translation to update the address information in the application layer.

It should be noted that, the address information in the application layer may include external addresses of a plurality of devices in the second local area network, and the external address of each device may exist at a plurality of positions in the application layer, and it is required to replace all the external addresses with corresponding private addresses.

Step 706: The remote access module of the second local area network forwards the packet to the destination device.

In this step, the remote access module of the second local area network takes the private address of the destination device as a new destination address of the packet, and forwards the packet to the second local area network.

According to the information synchronization method provided in this embodiment of the present invention, when two local area networks are connected in the form of remote access, communication is performed through external addresses of devices; when a packet is sent, a source address of the packet is translated from a private address into an external address, and the external address is taken as a new source address to send the packet; when the packet is received, a destination address of the packet is translated from an external address into a private address, and the packet is sent to the receiver according to the private address without changing the original private address of the device, which completes communication only through address translation and solves the problem that communication cannot be conducted in the case of address conflict. Meanwhile, it is also required to translate the address information carried in the application layer of the packet, which solves the problem that an UPnP protocol cannot operate normally in the case of address conflict.

Figure 10:
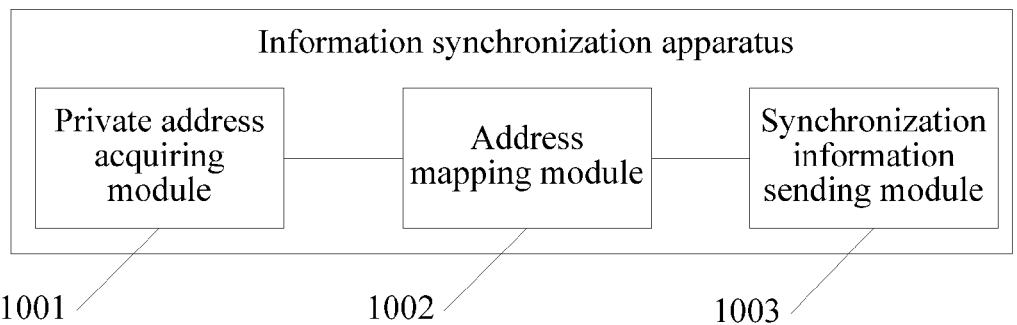
FIG. 10 is a schematic structural diagram of an information synchronization apparatus according to an embodiment of the present invention.

As shown in FIG. 10, an embodiment of the present invention further provides an information synchronization apparatus. A private address acquiring module 1001 is configured to acquire declaration information of a first local area network device that is in a first local area network, where the declaration information includes a private address of the first local area network device in the first local area network. An address mapping module 1002 is configured to map the private address of the first local area network device acquired by the private address acquiring module 1001 into a corresponding external address according to a preset mapping relation between private addresses and external addresses. A synchronization information sending module 1003 is configured to send a second local area network a notification message carrying the external address obtained through mapping by the address mapping module 1002, so as to enable the second local area network to store the external address of the first local area network device and notify a state of the first local area network device to a second local area network device in the second local area network.

Figure 11:
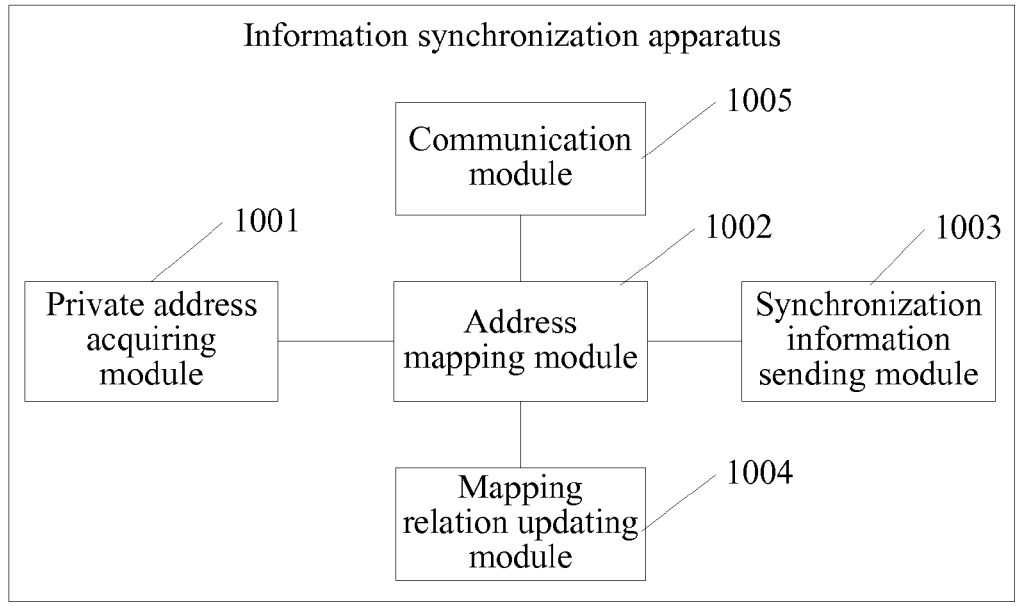
FIG. 11 is a schematic structural diagram of an information synchronization apparatus according to another embodiment of the present invention.

Furthermore, the information synchronization apparatus, as shown in FIG. 11, further includes a mapping relation updating module 1004 that is configured to update the mapping relation between the private addresses and the external addresses, so as to enable the address mapping module 1002 to map the private address of the first local area network device into an external address according to the updated mapping relation between the private addresses and the external addresses. In addition, or alternatively, a communication module 1005 is configured to communicate with the second local area network using the external address of the first local area network device obtained through mapping by the address mapping module 1002.

Figure 12:
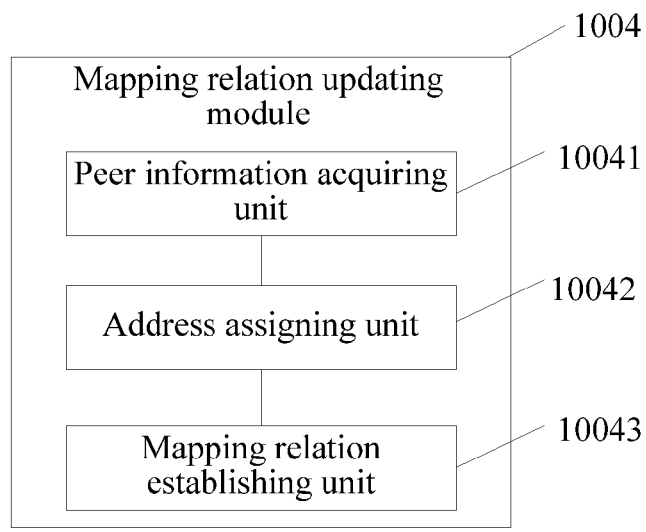
FIG. 12 is a schematic structural diagram of a mapping relation establishing module 1004 in FIG. 11.

Furthermore, as shown in FIG. 12, the mapping relation updating module 1004 may include a peer information acquiring unit 10041 that is configured to acquire a private address in the second local area network. An address assigning unit 10042 is configured to, if determining according to the private address in the second local area network acquired by the peer information acquiring unit 10041 that the private address of the first local area network device is in conflict with the private address in the second local area network, assign an external address to the first local area network device, where the external address is a private address unused by the first local area network and the second local area network.

A mapping relation establishing unit 10043 is configured to establish a mapping relation between the private address of the first local area network device and the external address assigned by the address assigning unit 10042.

Figure 13:
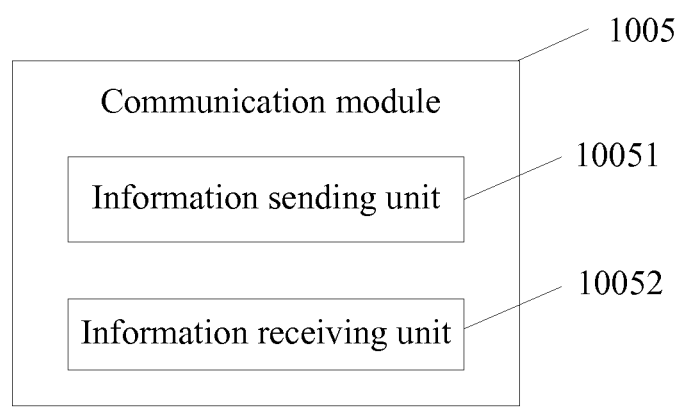
FIG. 13 is a schematic structural diagram of a communication module 1005 in FIG. 11.

Furthermore, as shown in FIG. 13, the communication module 1005 may include an information sending unit 10051 that is configured to receive a packet sent to the second local area network by the first local area network device, acquire an external address corresponding to the private address of the first local area network device according to the mapping relation between the private address and the external address of the first local area network device, and send the packet to the second local area network by taking the external address as a new source address of the packet.

In addition, or alternatively, an information receiving unit 10052 is configured to receive a packet sent to the first local area network device by the second local area network, to acquire the private address of the first local area network device according to the mapping relation between the private address and the external address of the first local area network device, and to send the packet to the first local area network by taking the private address as a new destination address of the packet.

Furthermore, the information sending unit 10051 may further include: a first replacing sub-unit, configured to replace the private address of the first local area network device included in an application layer of the packet sent by the information sending unit 10051 with the corresponding external address.

The information receiving unit 10052 may further include: a second replacing sub-unit, configured to replace the external address of the first local area network device included in the application layer of the packet received by the information receiving unit 10052 with the corresponding private address.

According to the information synchronization apparatus provided in this embodiment of the present invention, a private address of a first local area network device can be translated into an external address, and a second local area network is notified, so that the second local area network can store the external address of the first local area network device and notify a second local area network device of a state of the first local area network device, thereby achieving the objective of synchronizing information between the first local area network device and the second local area network device. Since the technical solution according to the embodiment of the present invention can translate the private address of the first local area network device into an external address, the problem of address conflict that may exist between the first local area network and the second local area network is solved, thereby achieving the objective of avoiding address conflict.

Figure 14:
FIG. 14 shows an information synchronization system according to an embodiment of the present invention.

As shown in FIG. 14, an embodiment of the present invention further provides an information synchronization system, including a first information synchronization apparatus 1401 and a second information synchronization apparatus 1402, where the first information synchronization apparatus 1401 and the second information synchronization apparatus 1402 are located in a first local area network and a second local area network respectively.

The first information synchronization apparatus 1401 is configured to acquire declaration information of a first local area network device that is in the first local area network, where the declaration information includes a private address of the first local area network device in the first local area network, map the private address of the first local area network device into a corresponding external address according to a preset mapping relation between private addresses and external addresses, and send a notification message carrying the external address of the first local area network device to the second information synchronization apparatus 1402.

The second information synchronization apparatus 1402 is configured to receive the notification message sent by the first information synchronization apparatus 1401, store the external address of the first local area network device carried in the notification message, and notify a state of the first local area network device to a second local area network device in the second local area network.

According to the information synchronization system provided in the embodiment of the present invention, a first information synchronization apparatus can translate a private address of a first local area network device into an external address, and notify a second information synchronization apparatus of a second local area network, so that the second information synchronization apparatus can store the external address of the first local area network device and notify a second local area network device of a state of the first local area network device, thereby achieving the objective of synchronizing information between the first local area network device and the second local area network device. Since the technical solution according to the embodiment of the present invention can translate the private address of the first local area network device into an external address, the problem of address conflict that may exist between the first local area network and the second local area network is solved, thereby achieving the objective of avoiding address conflict.

Persons of ordinary skill in the art should understand that all or a part of the steps in the method according to the embodiments of the present invention may be implemented by a program instructing relevant hardware. The program may be stored in a computer readable storage medium. When the program is run, one or a combination of the steps of the method according to the embodiments of the present invention are performed.

In addition, functional units according to the embodiments of the present invention may be integrated in a processing module, or may exist physically as separate units, or two or more than two units may be integrated in a module. The integrated module may be accomplished through hardware, or through software functional modules. If the integrated module is accomplished through the software functional modules and is sold or used as an independent product, the integrated module may also be stored in a computer readable storage medium.

The storage medium may be a read-only memory, a magnetic disk or an optical disk.

The objectives, technical solutions, and beneficial effects of the present invention have been described in further detail through the above specific embodiments. It should be understood that the above descriptions are merely specific embodiments of the present invention, but not intended to limit the protection scope of the present invention. Any modification, equivalent replacement, or improvement made without departing from the spirit and principle of the present invention should fall within the scope of the present invention.

What is claimed is:

1. An information synchronization method between a first local area network device in a first local area network and a second local area network device in a second local area network, comprising:
   acquiring, by the first local area network, declaration information of the first local area network device in the first local area network, wherein the declaration information is used to declare a state of the first local area network device in the first local area network, and further comprises an allocated private address of the first local area network device in the first local area network;
   mapping, by the first local area network, the allocated private address of the first local area network device into a corresponding external address according to a preset mapping relation between private addresses and external addresses; and
   sending, by the first local area network, a notification message carrying the external address of the first local area network device to the second local area network, so as to enable the second local area network to store the external address of the first local area network device and notify the state of the first local area network device to the second local area network device in the second local area network;
   wherein establishment of the preset mapping relation comprises:
   acquiring, by the first local area network, an allocated private address in the second local area network;
   based on the allocated private address of the first local area network device and the allocated private address in the second local area network, determining, by the first local area network, a private address unused by the first local area network and the second local area network as an external address when the allocated private address of the first local area network device is in conflict with the allocated private address in the second local area network;
   assigning, by the first local area network, the external address to the first local area network device; and
   establishing, by the first local area network, a mapping relation between the private address and the external address of the first local area network device.

2. The information synchronization method according to claim 1, further comprising:
   communicating with the second local area network using the external address of the first local area network device.

3. The information synchronization method according to claim 2, wherein the communicating with the second local area network using the external address of the first local area network device comprises:
   receiving, by the first local area network, a packet sent to the second local area network from the first local area network device, wherein a source address of the packet is the private address of the first local area network device;
   acquiring, by the first local area network, an external address corresponding to the private address of the first local area network device according to a mapping relation between the private address and the external address of the first local area network device; and
   sending, by the first local area network, the packet to the second local area network by taking the external address as a new source address of the packet.

4. The information synchronization method according to claim 3, further comprising:
   replacing the private address of the first local area network device comprised in an application layer of the packet with the corresponding external address.

5. An information synchronization apparatus located in a first local area network for synchronizing information between a first local area network device in the first local area network and a second local area network device in a second local area network, wherein the first local area network is capable of communicating with the second local area network;
   the information synchronization apparatus comprising:
   a private address acquiring module, configured to acquire declaration information of the first local area network device that is in the first local area network, wherein the declaration information is used to declare a state of the first local area network device in the first local area network, and further comprises an allocated private address of the first local area network device in the first local area network;

an address mapping module, configured to map the allocated private address of the first local area network device acquired by the private address acquiring module into a corresponding external address according to a preset mapping relation between private addresses and external addresses;

a synchronization information sending module, configured to send to the second local area network a notification message carrying the external address obtained through mapping by the address mapping module, so as to enable the second local area network to store the external address of the first local area network device and notify the state of the first local area network device to the second local area network device in the second local area network;

wherein the information synchronization apparatus further comprises a mapping relation establishing module, configured to establish the preset mapping relation between the private addresses and external addresses, and the mapping relation establishing module comprises:

a peer information acquiring unit, configured to acquire an allocated private address in the second local area network;

a determining unit, configured to, based on the allocated private address of the first local area network device and the allocated private address in the second local area network, determine a private address unused by the first local area network and the second local area network as an external address when the allocated private address of the first local area network device is in conflict with the allocated private address in the second local area network;

an address assigning unit, configured to, assign the external address to the first local area network device; and a mapping relation establishing unit, configured to establish a mapping relation between the private address of the first local area network device and the external address assigned by the address assigning unit.

6. The information synchronization apparatus according to claim 5, further comprising:

a communication module, configured to communicate with the second local area network using the external address of the first local area network device obtained through mapping by the address mapping module.

7. The information synchronization apparatus according to claim 6, wherein the communication module comprises:

an information sending unit, configured to receive a packet sent to the second local area network by the first local area network device, acquire an external address corresponding to the private address of the first local area network device according to the mapping relation between the private address and the external address of the first local area network device, and send the packet to the second local area network by taking the external address as a new source address of the packet.

8. The information synchronization apparatus according to claim 7, wherein the information sending unit further comprises a first replacing sub-unit, configured to replace the private address of the first local area network device comprised in an application layer of the packet sent by the information sending unit with the corresponding external address.

9. An information synchronization system, comprising:

a first information synchronization apparatus and a second information synchronization apparatus, wherein the first information synchronization apparatus and the second information synchronization apparatus are located in a first local area network and a second local area network respectively;

the first information synchronization apparatus is configured to acquire declaration information of a first local area network device that is in the first local area network, wherein the declaration information is used to declare a state of the first local area network device in the first local area network, and further comprises an allocated private address of the first local area network device in the first local area network, map the allocated private address of the first local area network device into a corresponding external address according to a preset mapping relation between private addresses and external addresses, and send a notification message carrying the external address of the first local area network device to the second information synchronization apparatus; and the second information synchronization apparatus is configured to receive the notification message sent by the first information synchronization apparatus, store the external address of the first local area network device carried in the notification message, and notify the state of the first local area network device to a second local area network device in the second local area network; and when establishing the preset mapping relation, the first information synchronization apparatus is further configured to acquire an allocated private address in the second local area network, based on the allocated private address of the first local area network device and the allocated private address in the second local area network determine a private address unused by the first local area network and the second local area network as an external address when the allocated private address of the first local area network device is in conflict with the allocated private address in the second local area network, assign the external address to the first local area network device, and establish a mapping relation between the private address and the external address of the first local area network device.

10. The information synchronization method according to claim 2, wherein the communicating with the second local area network using the external address of the first local area network device comprises:

receiving, by the first local area network, a packet sent to the first local area network device from the second local area network, wherein a destination address of the packet is the external address of the first local area network device;

acquiring, by the first local area network, the private address of the first local area network device according to the mapping relation between the private address and the external address of the first local area network device; and sending, by the first local area network, the packet to the first local area network by taking the private address as a new destination address of the packet.

11. The information synchronization method according to claim 10, further comprising:

replacing the private address of the first local area network device comprised in an application layer of the packet with the corresponding external address.

12. The information synchronization method according to claim 10, further comprising:

replacing the external address of the first local area network device comprised in an application layer of the packet with the corresponding private address.

13. The information synchronization method according to claim 3, further comprising:

replacing the external address of the first local area network device comprised in an application layer of the packet with the corresponding private address.

14. The information synchronization apparatus according to claim 6, wherein the communication module comprises:

an information receiving unit, configured to receive a packet sent to the first local area network device by the second local area network, acquire the private address of the first local area network device according to the mapping relation between the private address and the external address of the first local area network device, and send the packet to the first local area network by taking the private address as a new destination address of the packet.

15. The information synchronization apparatus according to claim 14, wherein the information receiving unit further comprises a second replacing sub-unit, configured to replace the external address of the first local area network device comprised in an application layer of the packet received by the information receiving unit with the private address corresponding thereto.

* * * * *

UNITED STATES PATENT AND TRADEMARK OFFICE
CERTIFICATE OF CORRECTION

PATENT NO.        : 8,832,314 B2                                        Page 1 of 1
APPLICATION NO.   : 13/295862
DATED             : September 9, 2014
INVENTOR(S)       : Huangwei Wu It is certified that error appears in the above-identified patent and that said Letters Patent is hereby corrected as shown below:

On the Title Page, item (73) Assignee, line 1, delete "Huawei Technologies Co., Ltd.," and insert --Huawei Device Co., Ltd.,--.

Signed and Sealed this
Eighteenth Day of November, 2014

Michelle K. Lee
*Deputy Director of the United States Patent and Trademark Office*